(12) United States Patent
Noh et al.

(10) Patent No.: US 11,815,879 B2
(45) Date of Patent: Nov. 14, 2023

(54) ELECTRONIC DEVICE FOR HEATING CONTROL, AND OPERATING METHOD THEREFOR

(71) Applicant: Samsung Electronics Co., Ltd., Suwon-si (KR)

(72) Inventors: Hyunjin Noh, Suwon-si (KR); Sungyong Bang, Suwon-si (KR); Jaewook Shin, Suwon-si (KR); Sangmin Lee, Suwon-si (KR); Inhwan Hwang, Suwon-si (KR); Jungwoo Ye, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 17/053,039

(22) PCT Filed: Apr. 4, 2019

(86) PCT No.: PCT/KR2019/003989
§ 371 (c)(1),
(2) Date: Nov. 4, 2020

(87) PCT Pub. No.: WO2019/212156
PCT Pub. Date: Nov. 7, 2019

(65) Prior Publication Data
US 2021/0240165 A1    Aug. 5, 2021

(30) Foreign Application Priority Data
May 4, 2018    (KR) .................. 10-2018-0051786

(51) Int. Cl.
*G05B 19/41* (2006.01)
*H04M 1/72* (2021.01)
(Continued)

(52) U.S. Cl.
CPC ........ *G05B 19/4155* (2013.01); *H04M 1/725* (2013.01); *G05B 2219/49216* (2013.01); *H04M 2250/12* (2013.01)

(58) Field of Classification Search
None
See application file for complete search history.

(56) References Cited

U.S. PATENT DOCUMENTS 5,986,249 A * 11/1999 Yoshino ................. H05B 6/688
219/754
6,274,859 B1 * 8/2001 Yoshino ............... H05B 6/6411
219/749

(Continued)

FOREIGN PATENT DOCUMENTS

KR    10-2013-0066657 A    6/2013
KR    10-2016-0026329 A    3/2016
(Continued)

OTHER PUBLICATIONS

International Search Report and Written Opinion of the International Searching Authority in connection with International Application No. PCT/KR2019/003989 dated Jul. 29, 2019, 11 pages.

(Continued)

*Primary Examiner* — Mohammad Ali
*Assistant Examiner* — Kelvin Booker

(57) ABSTRACT

An electronic device and an operating method therefor, according to various embodiments, can be configured to: determine whether heating of the electronic device is abnormal heating, on the basis of a difference value between a first temperature at a first position in the electronic device and a second temperature at a second position in the electronic device; determine whether a user recognizes abnormal heating, on the basis of the assumption that the heating of the electronic device is determined to be abnormal heating; and (Continued)

control the abnormal heating on the basis of determination result of whether the user has recognized abnormal heating.

18 Claims, 11 Drawing Sheets

(51) Int. Cl.
*G05B 19/4155* (2006.01)
*H04M 1/725* (2021.01)

(56) References Cited

U.S. PATENT DOCUMENTS

| | | | |
|---|---|---|---|
| 8,963,845 B2 | 2/2015 | Alameh et al. | |
| 10,031,484 B2 | 7/2018 | Shim et al. | |
| 10,222,269 B2 | 3/2019 | Park et al. | |
| 2007/0059002 A1* | 3/2007 | Yamamoto | G03G 15/2042 399/45 |
| 2010/0070130 A1* | 3/2010 | Suzuki | E02F 9/268 701/33.4 |
| 2011/0273378 A1* | 11/2011 | Alameh | H04M 1/72454 345/173 |
| 2012/0064948 A1 | 3/2012 | Lee et al. | |
| 2016/0062326 A1* | 3/2016 | Bang | G06F 1/206 700/299 |
| 2016/0209907 A1 | 7/2016 | Han et al. | |
| 2016/0245706 A1 | 8/2016 | Zivkovic et al. | |
| 2019/0110683 A1* | 4/2019 | Kim | G08B 21/0453 |
| 2019/0317662 A1* | 10/2019 | Cho | H04M 1/725 |

FOREIGN PATENT DOCUMENTS

| | | |
|---|---|---|
| KR | 10-2016-0041553 A | 4/2016 |
| KR | 10-2016-0121058 A | 10/2016 |
| KR | 10-2017-0068252 A | 6/2017 |
| WO | 2015026197 A1 | 2/2015 |

OTHER PUBLICATIONS

Notice of Patent Grant dated Jan. 17, 2023 in connection with Korean Patent Application No. 10-2018-0051786, 5 pages.

Office Action dated Aug. 17, 2022 in connection with Korean Patent Application No. 10-2018-0051786, 13 pages.

* cited by examiner

ELECTRONIC DEVICE FOR HEATING CONTROL, AND OPERATING METHOD THEREFOR

CROSS-REFERENCE TO RELATED APPLICATIONS

This application is a 371 National Stage of International Application No. PCT/KR2019/003989, filed Apr. 4, 2019, which claims priority to Korean Patent Application No. 10-2018-0051786, filed May 4, 2018, the disclosures of which are herein incorporated by reference in their entirety.

BACKGROUND

1. Field

Various embodiments relate to an electronic device for heating control, and an operating method therefor.

2. Description of Related Art

With the development of mobile communication technologies, an electronic device can perform not only a voice call function but also various data communication functions. The electronic device can provide various services through various applications. The electronic device can provide a multimedia service, for example, a music service, a video service, or a digital broadcasting service, a network-based communication service such as a call, wireless Internet, a short message service (SMS), a multimedia messaging service (MMS), etc., or the like. And, with evolving from a simple communication medium to a device possible to provide various functions such as communication, distribution, Internet, or payment, etc., the electronic device can be used throughout society, culture, finance, or distribution industry field. For this, the electronic device can mount various kinds of electronic parts.

SUMMARY

With at least any one of electronic parts operating in an electronic device, a heat can be generated. The heat generated in the electronic device can be discharged outside the electronic device. But, when the electronic device is kept in a closed space such as a bag or pocket or is arranged in adjacent to an external heating device such as a car dashboard, the heat generated in the electronic device may not be efficiently discharged outside the electronic device. Owing to this, the heat generated in the electronic device can cause a defect of at least any one of the electronic parts. Or, the heat generated in the electronic device can increase a surface temperature of the electronic device, to cause a low temperature burn to a user who is in contact with the electronic device.

An electronic device of various embodiments may include a first temperature sensor positioned at a first location, a second temperature sensor positioned at a second location spaced apart from the first location, a processor operably connected to the first temperature sensor and the second temperature sensor, and a memory operably connected to the processor.

According to various embodiments, the memory may store instructions of, when being executed, allowing the processor to determine whether heating of the electronic device is abnormal heating, on the basis of a difference value between a first temperature at the first location and a second temperature at the second location, and judge whether a user recognizes the abnormal heating, on the basis of the assumption that the heating of the electronic device is determined to be the abnormal heating, and control the abnormal heating on the basis of a result of judging whether the user has recognized.

An operating method of an electronic device of various embodiments may include determining whether heating of the electronic device is abnormal heating, on the basis of a difference value between a first temperature at a first location in the electronic device and a second temperature at a second location in the electronic device, and judging whether a user recognizes the abnormal heating, on the basis of the assumption that the heating of the electronic device is determined to be the abnormal heating, and controlling the abnormal heating, on the basis of a result of judging whether the user has recognized.

According to various embodiments, an electronic device may effectively control heating of the electronic device. The electronic device may sense that internal heating is not effectively discharged, and control a function which is being executed in the electronic device. That is, the electronic device may control the function which is being executed in the electronic device, even without user's handling. Through this, the electronic device may suppress heating caused by the function which is being executed. Accordingly, it may suppress the provision of a defect of electronic parts in the electronic device, and may prevent a low temperature burn of a user who is in contact with the electronic device.

DETAILED DESCRIPTION

Various embodiments of the present document are described below with reference to the accompanying drawings.

Figure 1:
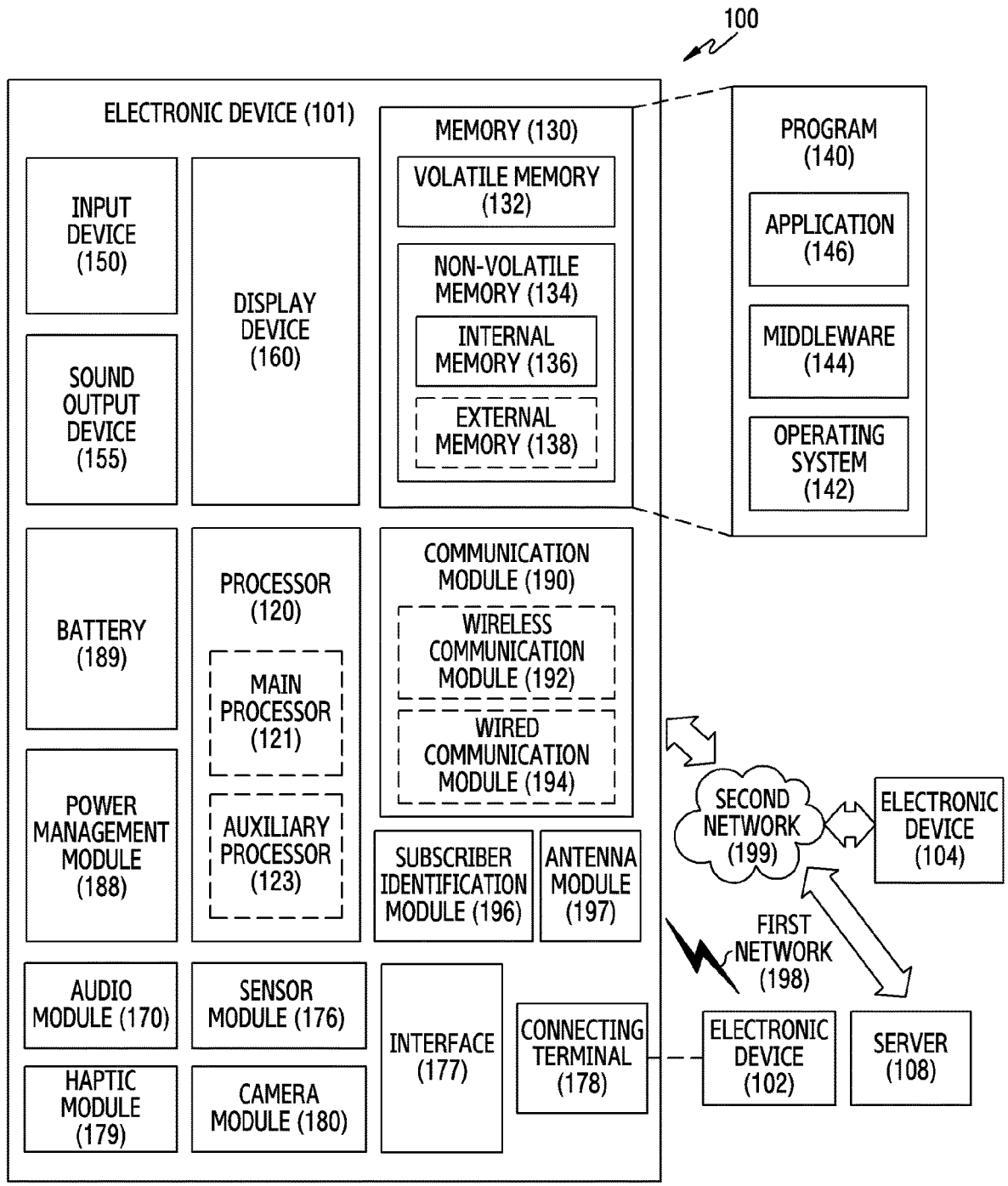
FIG. 1 is a block diagram of an electronic device within a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and in such a case, at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
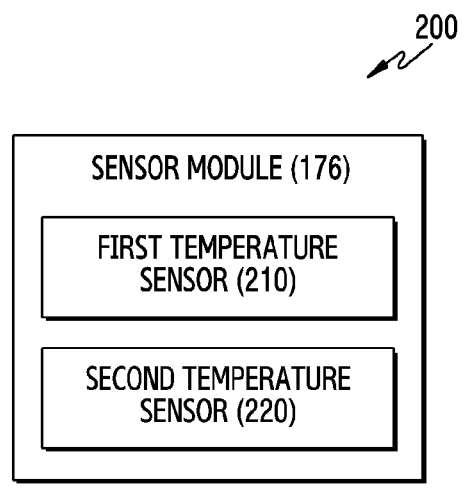
FIG. 2 is an example diagram of a sensor module in FIG. 1.

FIG. 2 is an example diagram 200 of the sensor module 176 in FIG. 1.

Referring to FIG. 2, the sensor module 176 may include at least one first temperature sensor 210 and at least one second temperature sensor 220.

According to various embodiments, the first temperature sensor 210 and the second temperature sensor 220 may sense a temperature in the electronic device 101. The first temperature sensor 210 may be positioned inside the processor 120 or outside the processor 120, and sense a first temperature associated with the processor 120. For example, the first temperature sensor 210 may be positioned in at least any one of a central processing unit, an application processor, an image signal processor, or a communication processor. The second temperature sensor 220 may be positioned at a distance from the first temperature sensor 210, and sense a second temperature. The second temperature sensor 220 may be positioned in at least any one of the battery 189, a wired or wireless charging circuit for the battery 189, the connection terminal 178, or the communication module 190. For example, the second temperature sensor 220 may be positioned in at least any one of a USB connector of the connection terminal 178, an amplifier of the communication module 190, or a WiFi communication module. A position of the first temperature sensor 210 may be interchangeably used with the term 'first location', and a position of the second temperature sensor 220 may be interchangeably used with the term 'second location'. The first temperature sensor 210 and the second temperature sensor 220 may have an electrical characteristic varying correspondingly to a temperature variation. For example, at least any one of the first temperature sensor 210 or the second temperature sensor 220 may include at least one thermistor, and have a characteristic in which an electrical resistance value varies correspondingly to a temperature variation.

According to various embodiments, the processor 120 may determine heating of the electronic device 101 (judge heating or non-heating). The processor 120 may determine the heating of the electronic device 101 (judge the heating or non-heating) at a period of a specified time interval. The processor 120 may measure a first temperature through the first temperature sensor 101, and determine the heating of the electronic device 101 (judge heating or non-heating) on the basis of the first temperature. For example, in response to the first temperature being equal to or being greater than a specified first threshold, the processor 120 may determine the heating of the electronic device (judge as a heating state). In an example, the first temperature may be associated with an application processor, and even the first threshold may be determined in relation with the application processor. In another example, the first temperature may be associated with a communication processor, and even the first threshold may be determined in relation with the communication processor.

According to various embodiments, the processor 120 may measure a second temperature through the second temperature sensor 220, and compare the first temperature and the second temperature, to determine whether heating of the electronic device 101 is abnormal heating or is normal heating. For this, the processor 120 may determine (or select) the second temperature sensor 220, in relation with the first temperature. For example, the processor 120 may determine (or select) the second temperature sensor 220, in accordance with whether the first temperature is associated with the application processor or is associated with the communication processor. In an example, in response to the first temperature being associated with the communication processor, the processor 120 may determine (or select) the second temperature sensor 220 which is positioned in an amplifier of the communication module 190. The abnormal heating may include where the heating of the electronic device 101 is not effectively discharged outside the electronic device 101, and the normal heating may include where the heating of the electronic device 101 is effectively discharged outside the electronic device 101. For example, in response to a difference value between the first temperature and the second temperature being less than a second threshold, the processor 120 may determine the abnormal heating (judge the heating of the electronic device 101 as the abnormal heating). According to an embodiment, in response to the difference value between the first temperature and the second temperature being less than the second threshold during a specified time, the processor 120 may determine the abnormal heating (judge the heating of the electronic device 101 as the abnormal heating). In response to the difference value between the first temperature and the second temperature being equal to or being greater than the second threshold, the processor 120 may determine the normal heating (judge the heating of the electronic device 101 as the normal heating). According to an embodiment, even though the difference value between the first temperature and the second temperature being less than the second threshold, in response to the difference value between the first temperature and the second temperature being varied equal to or greater than the second threshold, the processor 120 may determine the normal heating (judge the heating of the electronic device 101 as the normal heating).

According to various embodiments, the processor 120 may judge whether a user recognizes abnormal heating. The processor 120 may predict whether the user gets a low temperature burn caused by the abnormal heating, in accordance with whether the user has recognized the abnormal heating. According to an embodiment, the processor 120 may judge whether the user recognizes the abnormal heating, on the basis of a final reception time on an input of the user, which is identified through the input device 150. In response to a specified time having lapsed from the final reception time, the processor 120 may judge that the abnormal heating is not being recognized by the user. In response to the specified time having not lapsed from the final reception time, the processor 120 may judge that the abnormal heating is being recognized by the user, or there is a possibility in which the abnormal heating is recognized. According to another embodiment, the processor 120 may judge whether the user is in contact with the electronic device 101. For example, the processor 120 may judge whether the user is in contact with the electronic device 101, by using at least any one of an illuminance sensor, or a proximity sensor, of the sensor module 176.

According to various embodiments, the processor 120 may control heating of the electronic device 101. The processor 120 may control the abnormal heating, and disregard the normal heating. The processor 120 may control the abnormal heating, on the basis of whether a user has recognized the abnormal heating. For this, the processor 120 may identify the cause of provision of the abnormal heating. The processor 120 may identify at least any one of a function which is being executed, or a system resource associated with the function which is being executed. The system resource may include at least any one of a processing speed of the function which is being executed, a display brightness, or a volume. The processing speed may include at least any one of, for instance, a frame rate or a clock speed. Through this, the processor 120 may determine a system resource to control, or a control level thereof. The processor 120 may determine the control level, for instance, an operation level, in accordance with whether the user has recognized the abnormal heating. By controlling the determined system resource to the determined control level, the processor 120 may control the abnormal heating of the electronic device 101.

For example, the operation level associated with the function may include a first level, a second level lower than the first level, and a third level lower than the second level. In an example, the function which is being executed may include a communication operation. In an embodiment, the operation level of the function may be set to the first level. In response to heating of the electronic device 101 not being determined (in response to the electronic device 101 being judged not to be in a heating state), or normal heating of the electronic device 110 being determined (the heating of the electronic device 101 being judged to be normal heating), the processor 120 may maintain the operation level of the function which is being executed, as the first level. In an example, the processor 120 may set any one of a plurality of communication schemes usable in the electronic device 101, and perform a communication operation through the set communication scheme. In another example, the processor 120 may perform a communication operation, on the basis of a specified quality of service (QoS). In response to the abnormal heating of the electronic device 101 being determined (in response to heating of the electronic device 101 being judged to be abnormal heating), the processor 120 may control (change or set) the operation level of the function which is being executed, to any one of the second level or the third level. In an example, the processor 120 may change the set communication scheme to another one of the plurality of communication schemes, and perform a communication operation through the changed communication scheme. In another example, the processor 120 may perform the communication operation, on the basis of a quality of service having a lower level than a specified quality of service. In response to the abnormal heating being judged to be recognized by a user, the processor 120 may control (change or set) the operation level of the function which is being executed, to the second level. In response to the abnormal heating being judged not to be recognized by the user, the processor 120 may control (change or set) the operation level of the function which is being executed, to the third level. In an example, in relation with a game application which is being executed in an automatic play mode, the processor 120 may control (or set) a processing speed of the game application, from 60 frames per second (FPS) of the first level to any one of 30 FPS of the second level or 1 FPS of the third level.

The electronic device 101 of various embodiments may include the first temperature sensor 210 positioned at a first location, the second temperature sensor 220 positioned at a second location spaced apart from the first location, the processor 120 operably connected to the first temperature sensor 210 and the second temperature sensor 220, and the memory 130 operably connected to the processor 120.

According to various embodiments, the memory 130 may store instructions of, when being executed, allowing the processor 120 to determine whether heating of the electronic device 101 is abnormal heating, on the basis of a difference value between a first temperature at the first location and a second temperature at the second location, and judge whether a user recognizes the abnormal heating, on the basis of the assumption that the heating of the electronic device 101 is determined to be the abnormal heating, and control the abnormal heating on the basis of a result of judging whether the user has recognized.

According to various embodiments, the memory 130 may store instructions of, when being executed, allowing the processor 120 to determine the heating of the electronic device 101 as the abnormal heating, in response to the first temperature being equal to or being greater than a specified first threshold and the difference value being less than a specified second threshold.

According to various embodiments, the memory 130 may store instructions of, when being executed, allowing the processor 120 to determine the heating of the electronic device 101 as the abnormal heating, in response to the difference value being less than the second threshold during a specified time.

According to various embodiments, the electronic device 101 may further include the input device 150 operably connected to the processor 120.

According to various embodiments, the memory 130 may store instructions of, when being executed, allowing the processor 120 to judge that the abnormal heating is not being recognized by the user, in response to a specified time having elapsed from a final reception time on an input of the user identified through the input device 150.

According to various embodiments, the memory 130 may store instructions of, when being executed, allowing the processor 120 to control the abnormal heating, in response to a contact of the user to the electronic device 101 being identified in a state of judging that the abnormal heating is not being recognized by the user.

According to various embodiments, the electronic device 101 may further include at least any one of an illuminance sensor or a proximity sensor, which is operably connected to the processor 120.

According to various embodiments, the memory 130 may store instructions of, when being executed, allowing the processor 120 to identify the contact of the user by using at least any one of the illuminance sensor or the proximity sensor.

According to various embodiments, the memory 130 may store instructions of, when being executed, allowing the processor 120 to change an operation level of a function which is being executed, from a first level to a second level lower than the first level, on the basis of the assumption of judging that the abnormal heating is being recognized by the user, and change the operation level of the function which is being executed, to a third level lower than the second level, on the basis of the assumption of judging that the abnormal heating is not being recognized by the user.

According to various embodiments, the memory 130 may store instructions of, when being executed, allowing the processor 120 to determine restoring or non-restoring of the changed operation level, on the basis of an input of the user identified through a user interface, and restore the changed operation level to any one of the first level or the second level, on the basis of the input of the user.

According to various embodiments, the memory 130 may store instructions of, when being executed, allowing the processor 120 to control at least any one of a processing speed for a function which is being executed, a display brightness, or a volume.

According to various embodiments, the processor 120 may include at least any one of a central processing unit, an application processor, an image signal processor, or a communication processor.

According to various embodiments, the first temperature sensor 210 may be positioned in at least any one of a central processing unit, an application processor, an image signal processor, or a communication processor.

According to various embodiments, the electronic device 101 may further include at least any one of the battery 189 operably connected to the processor 120, a charging circuit for the battery 189, the connection terminal 178, or the communication module 190.

According to various embodiments, the second temperature sensor 220 may be positioned in at least any one of the battery 189, the charging circuit, the connection terminal 178, or the communication module 190.

Figure 3:
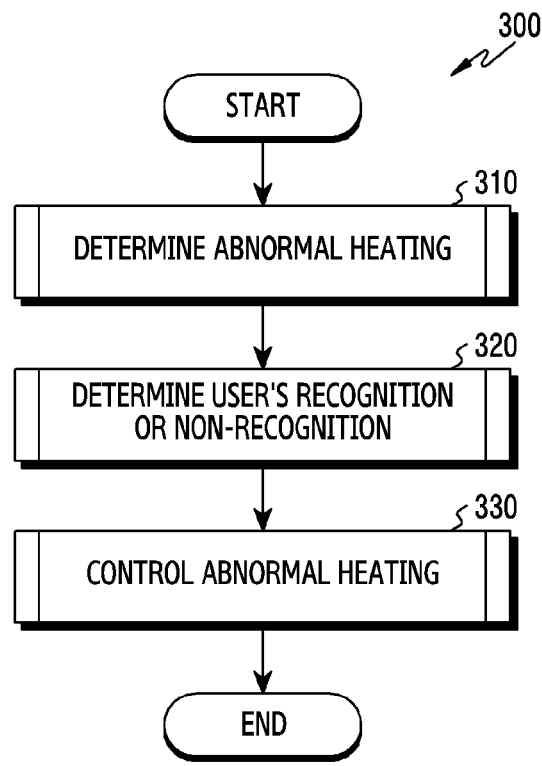
FIG. 3 is a flowchart of an operating method of an electronic device according to various embodiments.

FIG. 3 is a flowchart 300 of an operating method 300 of the electronic device 101 according to various embodiments.

Referring to FIG. 3, in operation 310, the electronic device 101 of various embodiments may determine abnormal heating of the electronic device 101 (judge whether heating of the electronic device 101 is abnormal heating). For example, the processor 120 may determine the heating of the electronic device 101 (judge heating or non-heating) at a period of a specified time interval. The processor 120 may determine the heating of the electronic device 101 (judge heating or non-heating) by using the sensor module 176. The processor 120 may determine whether the heating of the electronic device 101 is abnormal heating or is normal heating. The sensor module 176 may include at least one first temperature sensor 210 and at least one second temperature sensor 220. The first temperature sensor 210 and the second temperature sensor 220 may sense a temperature in the electronic device 101. The first temperature sensor 210 may sense a first temperature at a first location, and the second temperature sensor 220 may sense a second temperature at a second location. The processor 120 may determine the heating of the electronic device 101 (judge heating or non-heating) on the basis of the first temperature. The processor 120 may compare the first temperature and the second temperature, to determine whether the heating of the electronic device 101 is abnormal heating or is normal heating.

According to various embodiments, in operation 320, the electronic device 101 may determine (or judge) whether a user recognizes the abnormal heating. For example, the processor 120 may determine (or judge) whether the user recognizes the abnormal heating, by using at least any one of the input device 150 or the sensor module 176.

According to various embodiments, in operation 330, the processor 101 may control the abnormal heating. For example, the processor 120 may control the abnormal heating, and disregard the normal heating.

Figure 4:
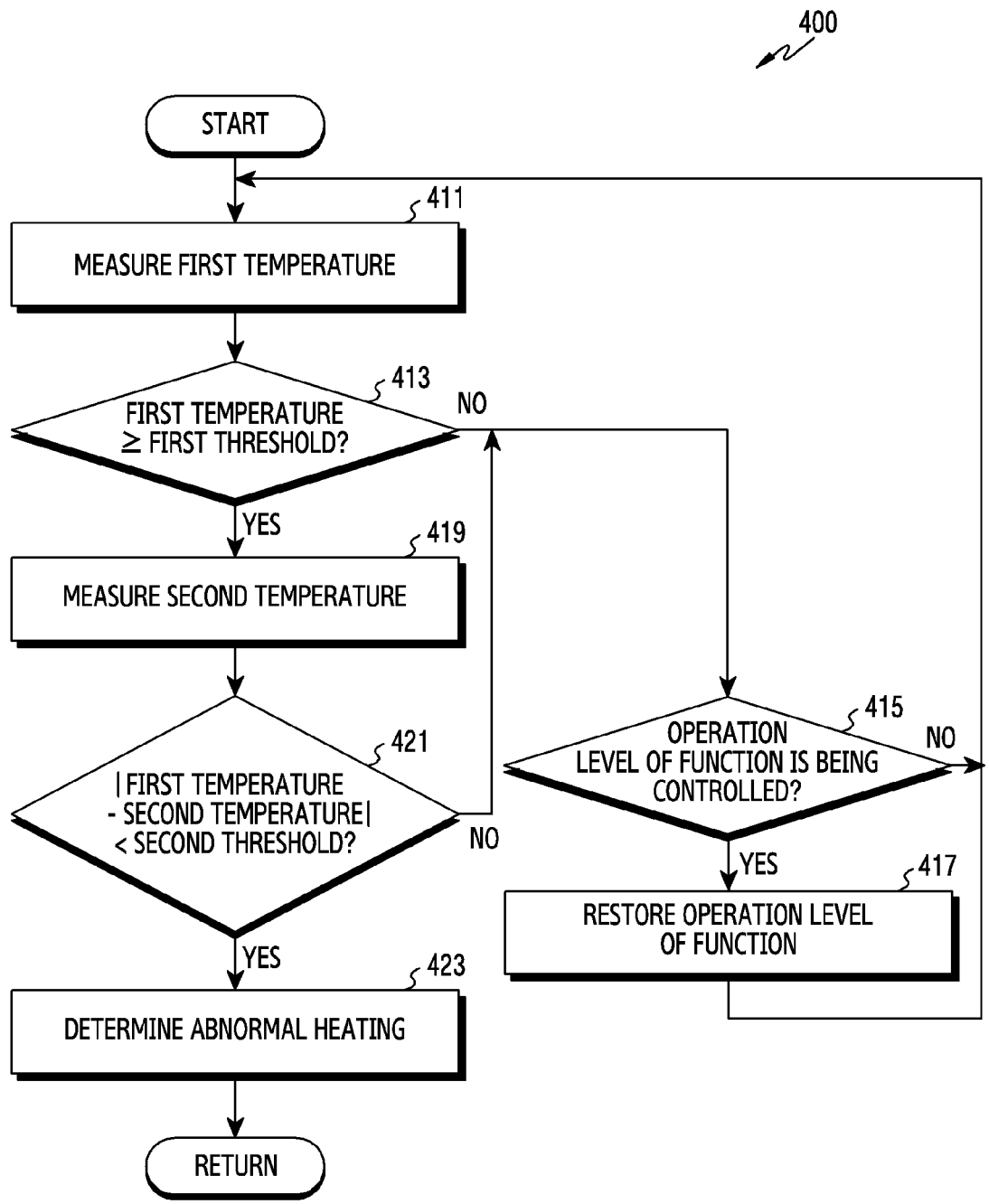
FIG. 4 and FIG. 5 are flowcharts of an operation of determining abnormal heating in FIG. 3.

FIG. 4 is a flowchart 400 of operation 310 of determining abnormal heating according to an embodiment.

Referring to FIG. 4, in operation 411, the electronic device 101 of various embodiments may measure a first temperature. For example, the processor 120 may measure the first temperature at a first location through the first temperature sensor 210. The first location may represent a position of the first temperature sensor 210. The first temperature sensor 210 may be positioned in the processor 120. The first temperature sensor 210 may be positioned in at least any one of a central processing unit, an application processor, an image signal processor, or a communication processor.

According to various embodiments, in operation 413, the electronic device 101 may compare the first temperature and a specified first threshold. For example, the processor 120 may judge whether the first temperature is equal to or is greater than the first threshold.

According to various embodiments, in response to it being judged that the first temperature is less than the first threshold (NO) in operation 413, the electronic device 101 may, in operation 415, judge whether an operation level of a function which is being executed is being controlled (has been changed). For example, in response to the first temperature being less than the first threshold, a heat may not be provided in the electronic device 101, or heating of the electronic device 101 may be normal heating provided in the electronic device 101. In this case, the electronic device 101 may restore the operation level of the function which has been changed, to the original level (e.g., a first level). To restore the operation level of the function which has been changed, the processor 120 may identify at least any one of operation levels of the function which is being executed. For instance, the processor 120 may judge whether the operation level of the function which is being executed is being controlled (has been changed) to any one of a second level or a third level.

According to various embodiments, in response to it being judged that the operation level of the function which is being executed is not being controlled (has not been changed) (NO) in operation 415, the electronic device 101 may return to operation 411.

According to various embodiments, in response to it being judged that the operation level of the function which is being executed is being controlled (has been changed) (YES) in operation 415, the electronic device 101 may, in operation 417, restore the operation level of the function which is being executed. For example, in response to the operation level of the function which is being executed being any one of the second level or the third level, the processor 120 may restore the operation level of the function which is being executed, to the first level. After restoring the operation level of the function which is being executed in operation 417, the electronic device 101 may return to operation 411.

According to various embodiments, in response to it being judged that the first temperature is equal to or is greater than the first threshold (YES) in operation 413, the electronic device 101 may, in operation 419, measure a second temperature. For example, the processor 120 may measure the second temperature at a second location through the second temperature sensor 220. The second location may represent a position of the second temperature sensor 220. The second temperature sensor 220 may be positioned at a distance from the first temperature sensor 210. The second temperature sensor 220 may be positioned in at least any one of the battery 189, a wired or wireless charging circuit for the battery 189, the connection terminal 178, or the communication module 190. In an example, the second temperature sensor 220 may be positioned in at least any one of a USB connector of the connection terminal 178, an amplifier of the communication module 190, or a WiFi communication module.

According to various embodiments, in operation 421, the electronic device 101 may compare a difference value between the first temperature and the second temperature with a specified second threshold. For example, the processor 120 may calculate the difference value between the first temperature and the second temperature. By subtracting a small value from a large value among the first temperature or the second temperature, the processor 120 may calculate the difference value. The processor 120 may calculate the difference value, as an absolute value of a result value of subtracting another value from any one value among the first temperature or the second temperature. The processor 120 may judge whether the difference value is less than the second threshold.

According to various embodiments, in response to it being judged that the difference value between the first temperature and the second temperature is equal to or is greater than the second threshold in operation 421, the electronic device 110 may proceed to operation 415. For example, in response to the difference value between the first temperature and the second temperature being equal to or being greater than the second threshold, heating of the electronic device 101 may be normal heating provided in the electronic device 101. In response to the difference value between the first temperature and the second temperature being equal to or being greater than the second threshold, the processor 120 may determine that the heating of the electronic device 101 is the normal heating. After performing at least any one of operation 415 or operation 417, the electronic device 101 may return to operation 411.

According to various embodiments, in response to it being judged that the difference value between the first temperature and the second temperature being less than the second threshold in operation 421, the processor 120 may, in operation 423, determine abnormal heating (judge the heating of the electronic device 101 as the abnormal heating). For example, in response to the difference value between the first temperature and the second temperature being less than the second threshold, the heating of the electronic device 101 may be abnormal heating provided in the electronic device 101. In response to a heat being provided at an abnormal high temperature in the electronic device 101 or a heat provided in the electronic device 101 not being efficiently discharged outside the electronic device 101, the electronic device 101 may determine the abnormal heating (judge the heating as the abnormal heating). In response to the difference value between the first temperature and the second temperature being less than the second threshold, the processor 120 may determine that the heating of the electronic device 101 is the abnormal heating. After determining that the heating of the electronic device 101 is the abnormal heating, the electronic device 101 may return to FIG. 3.

Figure 5:
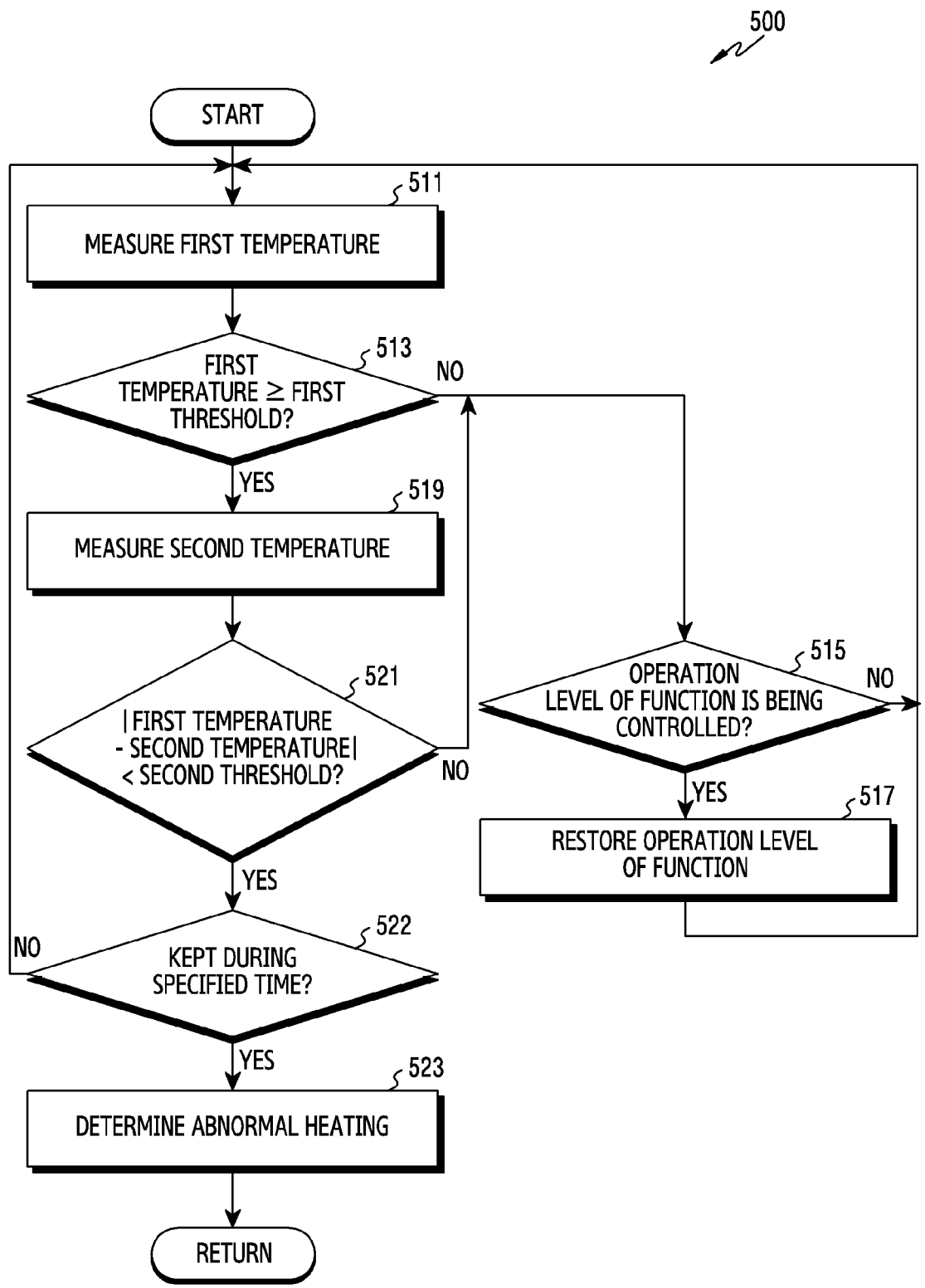

FIG. 5 is a flowchart 500 of operation 310 of determining abnormal heating according to another embodiment.

Referring to FIG. 5, in operation 511, the electronic device 101 of various embodiments may measure a first temperature. For example, the processor 120 may measure the first temperature at a first location through the first temperature sensor 210. The first location may represent a position of the first temperature sensor 210. The first temperature sensor 210 may be positioned in the processor 120.

The first temperature sensor 210 may be positioned in at least any one of a central processing unit, an application processor, an image signal processor, or a communication processor. According to various embodiments, in operation 513, the electronic device 101 may compare the first temperature and a specified first threshold. The processor 120 may judge whether the first temperature is equal to or is greater than the first threshold.

According to various embodiments, in response to it being judged that the first temperature is less than the first threshold (NO) in operation 513, the electronic device 101 may, in operation 515, judge whether an operation level of a function which is being executed is being controlled (has been changed). For example, in response to the first temperature being less than the first threshold, a heat may not be provided in the electronic device 101, or heating of the electronic device 101 may be normal heating provided in the electronic device 101. In this case, the electronic device 101 may restore an operation level of a function which has been changed, to the original level (e.g., a first level). To restore the operation level of the function which has been changed, the processor 120 may identify at least any one of operation levels of the function which is being executed. For instance, the processor 120 may judge whether the operation level of the function which is being executed is being controlled (has been changed) to any one of a second level or a third level.

According to various embodiments, in response to it being judged that the operation level of the function which is being executed is not being controlled (has not been changed) (NO) in operation 515, the electronic device 101 may return to operation 511.

According to various embodiments, in response to it being judged that the operation level of the function which is being executed is being controlled (has been changed) (YES) in operation 515, the electronic device 101 may, in operation 517, restore the operation level of the function which is being executed. For example, in response to the operation level of the function which is being executed being any one of the second level or the third level, the processor 120 may restore the operation level of the function which is being executed, to the first level. After restoring the operation level of the function which is being executed in operation 517, the electronic device 101 may return to operation 511.

According to various embodiments, in response to it being judged that the first temperature is equal to or is greater than the first threshold (YES) in operation 513, the electronic device 101 may, in operation 519, measure a second temperature. For example, the processor 120 may measure the second temperature at a second location through the second temperature sensor 220. The second location may represent a position of the second temperature sensor 220. The second temperature sensor 220 may be positioned at a distance from the first temperature sensor 210. The second temperature sensor 220 may be positioned in at least any one of the battery 189, a wired or wireless charging circuit for the battery 189, the connection terminal 178, or the communication module 190. The second temperature sensor 220 may be positioned in at least any one of a USB connector of the connection terminal 178, an amplifier of the communication module 190, or a WiFi communication module.

According to various embodiments, in operation 521, the electronic device 101 may compare a difference value between the first temperature and the second temperature with a specified second threshold. For example, the processor 120 may calculate the difference value between the first temperature and the second temperature. By subtracting a small value from a large value among the first temperature or the second temperature, the processor 120 may calculate the difference value. The processor 120 may calculate the difference value, as an absolute value of a result value of subtracting another value from any one value among the first temperature or the second temperature. The processor 120 may judge whether the difference value is less than the second threshold.

According to various embodiments, in response to it being judged that the difference value between the first temperature and the second temperature is equal to or is greater than the second threshold (NO) in operation 521, the electronic device 110 may proceed to operation 515. For example, in response to the difference value between the first temperature and the second temperature being equal to or being greater than the second threshold, heating of the electronic device 101 may be normal heating provided in the electronic device 101. In response to the difference value between the first temperature and the second temperature being equal to or being greater than the second threshold, the processor 120 may determine that the heating of the electronic device 101 is the normal heating. After performing at least any one of operation 515 or operation 517, the electronic device 101 may return to operation 511.

According to various embodiments, in response to it being judged that the difference value between the first temperature and the second temperature is less than the second threshold (YES) in operation 521, the electronic device 101 may, in operation 522, judge whether the difference value between the first temperature and the second temperature is being kept less than the second threshold during a specified time. For example, the processor 120 may judge whether the difference value between the first temperature and the second temperature is being kept less than the second threshold during the specified time. The specified time may be determined as a time which is expected to be required for a user to get a low temperature burn due to the abnormal heating of the electronic device 101.

According to various embodiments, in response to it being judged that the difference value between the first temperature and the second temperature is not kept less than the second threshold during the specified time (NO) in operation 522, the electronic device 110 may return to operation 511.

According to various embodiments, in response to it being judged that the difference value between the first temperature and the second temperature is kept less than the second threshold during the specified time (YES) in operation 522, the electronic device 101 may, in operation 523, determine abnormal heating (judge the heating of the electronic device 101 as the abnormal heating). For example, in response to the difference value between the first temperature and the second temperature being less than the second threshold, heating of the electronic device 101 may be abnormal heating provided in the electronic device 101. In response to a heat being provided at an abnormal high temperature in the electronic device 101 or a heat provided in the electronic device 101 not being efficiently discharged outside the electronic device 101, the electronic device 101 may determine the abnormal heating (judge the heating as the abnormal heating). In response to the difference value between the first temperature and the second temperature being less than the second threshold, the processor 120 may determine that the heating of the electronic device 101 is the abnormal heating. After determining that the heating of the electronic device 101 is the abnormal heating, the electronic device 101 may return to FIG. 3.

According to various embodiments, in operation 320, the electronic device 101 may determine whether a user recognizes the abnormal heating. The electronic device 101 may predict whether the user is possible to get a low temperature burn due to the abnormal heating of the electronic device 101, in accordance with whether the user has recognized the abnormal heating. For example, the processor 120 may determine whether the user recognizes the abnormal heating, by using at least any one of the input device 150 or the sensor module 176. According to an embodiment, the processor 120 may judge whether the user recognizes the abnormal heating through the input device 150. According to another embodiment, the processor 120 may judge whether the user is in contact with the electronic device 101. According to another embodiment, in response to it being judged that the abnormal heating is being recognized by the user, the processor 120 may judge whether the user is in contact with the electronic device 101.

Figure 6:
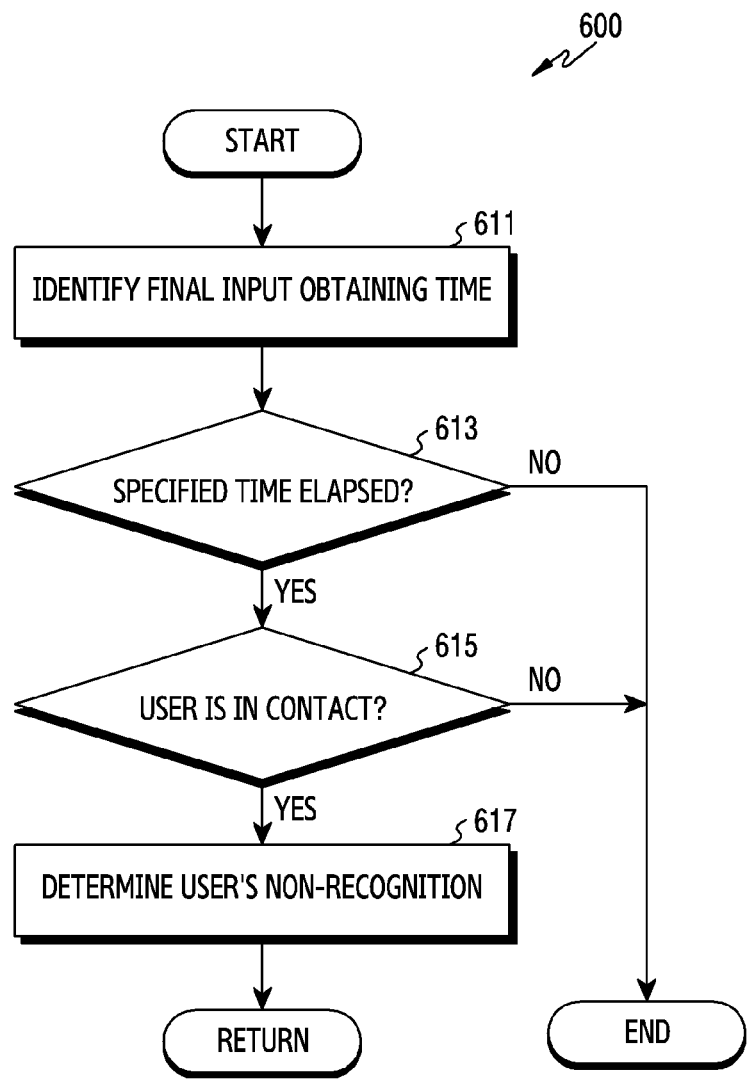
FIG. 6 is a flowchart of an operation of determining user's recognition or non-recognition in FIG. 3.

FIG. 6 is a flowchart 600 of operation 320 of determining user's recognition or non-recognition in FIG. 3.

Referring to FIG. 6, in operation 611, the electronic device 101 of various embodiments may identify a final reception time on an input of a user. For example, the processor 120 may identify the final reception time on the input of the user, which is identified through the input device 150. The input device 150 may include at least anyone of a touch panel or at least one physical key. In an example, the processor 120 may identify a final reception time on a touch input of the user, which is identified through the touch panel. In another example, the processor 120 may identify a final reception time on a key input of the user, which is identified through the physical key.

According to various embodiments, in operation 613, the electronic device 101 may judge whether a specified time has lapsed from the final reception time. For example, the processor 120 may identify a current time. The processor 120 may judge whether a difference of time between the final reception time and the current time is equal to or is greater than the specified time.

According to various embodiments, in response to it being judged that the specified time has not lapsed from the final reception time (NO) in operation 613, the electronic device 101 may terminate the operation. For example, in response to the specified time not having lapsed from the final reception time, abnormal heating is being recognized by the user, or there is a possibility in which the abnormal heating is recognized. In addition, in response to the specified time not having lapsed from the final reception time, the user would not get a low temperature burn. For this reason, in response to the difference of time between the final reception time and the current time being less than the specified time, the processor 120 may terminate the operating method of the electronic device 101.

According to various embodiments, in response to it being judged that the specified time having lapsed from the final reception time (YES) in operation 613, the electronic device 101 may, in operation 615, judge whether the user is in contact with the electronic device 101. For example, in response to the specified time having lapsed from the final reception time, there is a possibility in which the abnormal heating is not being recognized by the user. In addition, in response to the user being in contact with the electronic device 101 from the final reception time to the current time, there is a possibility in which the user gets a low temperature burn. For this reason, in response to the difference of time between the final reception time and the current time being equal to or being greater than the specified time, the processor 120 may judge whether the user is in contact with the electronic device 101.

For example, the processor 120 may judge whether the user is in contact with the electronic device 101, by using at least any one of an illuminance sensor, or a proximity sensor, of the sensor module 176, a touch panel of the input device 150, or an image sensor of the camera module 180. In an example, the processor 120 may compare a sensed peripheral brightness with a specified brightness, through the illuminance sensor. In response to the peripheral brightness being equal to or being less than the specified brightness, the processor 120 may judge that the human body of the user is in contact with the electronic device 101. In another example, the processor 120 may judge whether the human body of the user is in contact with the electronic device 101, through the proximity sensor. In a further example, in response to the peripheral brightness being equal to or being less than the specified brightness, the processor 120 may judge whether the human body of the user is in contact with the electronic device 101, through the proximity sensor. Ina yet another example, the processor 120 may judge that the human body of the user is in contact with the electronic device 101, on the basis of at least anyone of a touch area or pressure which is sensed in the touch panel. In a still another example, the processor 120 may judge whether the human body of the user is in contact with the electronic device 101, on the basis of a quantity of light received by the image sensor.

According to various embodiments, in response to it being judged that the user is not in contact with the electronic device 101 (NO) in operation 615, the electronic device 101 may terminate the operation. For example, in response to the user not being in contact with the electronic device 101, there is a possibility in which abnormal heating is being recognized by the user. In addition, in response to the user not being in contact with the electronic device 101, there is not a possibility in which the user gets a low temperature burn. For this reason, in response to the user not being in contact with the electronic device 101, the processor 120 may terminate the operating method of the electronic device 101.

According to various embodiments, in response to it being judged that the user is in contact with the electronic device 101 (YES) in operation 615, the electronic device 101 may, in operation 617, determine that the user does not recognize the abnormal heating. For example, in response to the user being in contact with the electronic device 101, there is a high possibility in which the user is failing to recognize the abnormal heating. In addition, in response to the user being in contact with the electronic device 101, there is a high possibility in which the user gets a low temperature burn. For this reason, in response to the user being in contact with the electronic device 101, the processor 120 may judge that the abnormal heating is not being recognized by the user. After determining that the user does not recognize the abnormal heating, the electronic device 101 may return to FIG. 3.

According to various embodiments, in operation 330, the processor 101 may control the abnormal heating. For example, the processor 120 may control the abnormal heating, and disregard the normal heating. The processor 120 may control the abnormal heating, on the basis of whether the user has recognized the abnormal heating. For this, the processor 120 may control a function which is being executed. The processor 120 may control (change or set) an operation level of the function which is being executed, correspondingly to the abnormal heating. In response to the abnormal heating being recognized by the user, the processor 120 may control (change or set) the operation level of the function which is being executed, from a first level to a second level lower than the first level. In response to the abnormal heating not being recognized by the user, the processor 120 may control (change or set) the operation level of the function which is being executed, from the first level to a third level lower than the second level.

Figure 7:
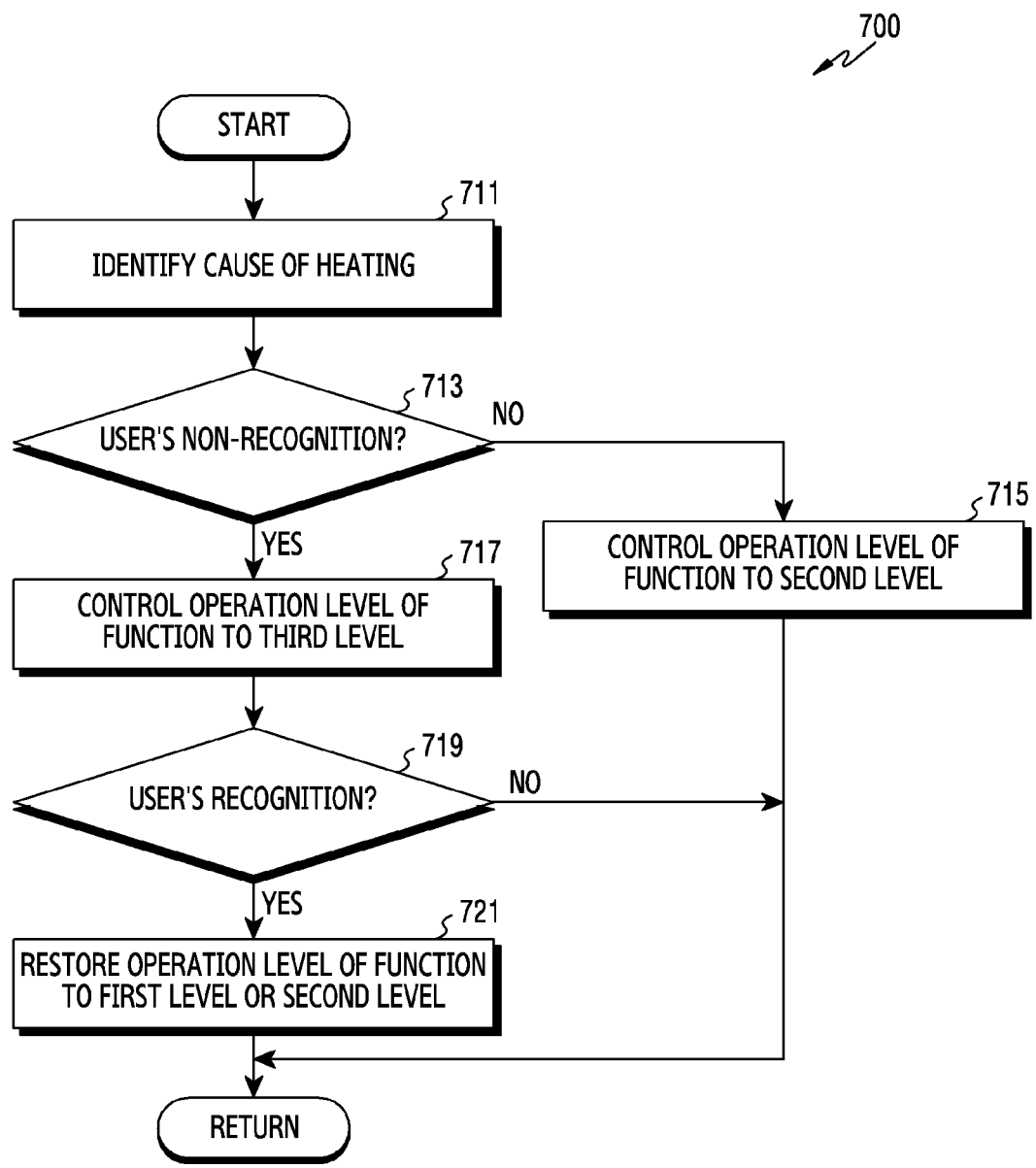
FIG. 7 is a flowchart of an operation of controlling abnormal heating in FIG. 3.

FIG. 7 is a flowchart 700 of operation 330 of controlling abnormal heating in FIG. 3. FIG. 8A, FIG. 8B, FIG. 8C, and FIG. 8D are example diagrams 810, 820, 830, and 840 of operation 330 of controlling the abnormal heating in FIG. 3.

Referring to FIG. 7 and FIG. 8A to FIG. 8D, in operation 711, the electronic device 101 of various embodiments may determine (or judge) the cause of provision of abnormal heating. For example, the processor 120 may determine (or judge) the cause of provision of the abnormal heating, on the basis of at least any one of a function which is being executed or a system resource associated with the function which is being executed. For this, the processor 120 may identify the function which is being executed. In response to there being the function which is being executed, the processor 120 may identify at least any one of the system resource associated with the function which is being executed. The operation level of the function which is being executed may be a first level. The system resource may include at least any one of a processing speed of the function which is being executed, a display brightness, or a volume. The processing speed may include at least any one of, for instance, a frame rate, a clock speed, a use amount control of the processor 120 for a process which is operating as a background, a WiFi transmission throughput, or a charging speed. Through this, the processor 120 may determine, as the cause of provision of the abnormal heating, the system resource to control, for instance, at least any one of the processing speed of the function which is being executed, the display brightness, or the volume.

Figure 8A:
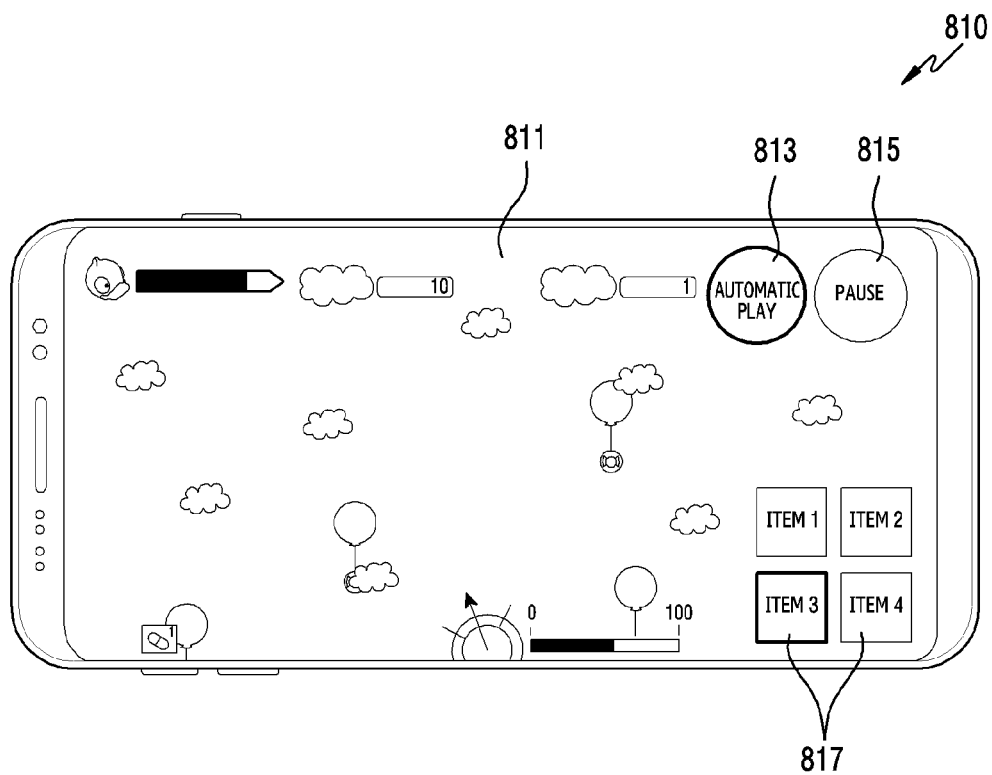
FIG. 8A, FIG. 8B, FIG. 8C, and FIG. 8D are example diagrams of an operation of controlling abnormal heating in FIG. 3.

In an example, the function which is being executed may be a game application which is being executed in an automatic play mode. In response to an operation level of the game application being the first level, a processing speed of the game application may be 60 FPS, and a display brightness may be 255, and a volume may be 80. In response to the game application being executed in the automatic play mode, the processor 120 may, as illustrated in FIG. 8A, display a screen 811 related with the game application at a first brightness, through the display device 160. The screen 811 related with the game application may include at least any one of a first icon 813 for initiating or stopping the automatic play mode, a second icon 815 for pausing the game application, or at least one third icon 817 indicating at least one item for applying in course of running the game application.

According to various embodiments, in operation 713, the electronic device 101 may judge whether a user does not recognize the abnormal heating. The electronic device 101 may judge whether the user does not recognize the abnormal heating, on the basis of the result determined in operation 320. For example, the processor 120 may judge whether the user is in contact with the electronic device 101.

According to various embodiments, in response to it being judged that the abnormal heating is being recognized by the user (NO) in operation 713, the electronic device 101 may, in operation 715, control (change or set) an operation level of a function which is being executed. For example, the processor 120 may control (change or set) the operation level of the function which is being executed, correspondingly to the abnormal heating. The processor 120 may control (change or set) the operation level of the function which is being executed, from the first level to a second level lower than the first level. After controlling the function which is being executed, the electronic device 101 may return to FIG. 3.

Figure 8B:
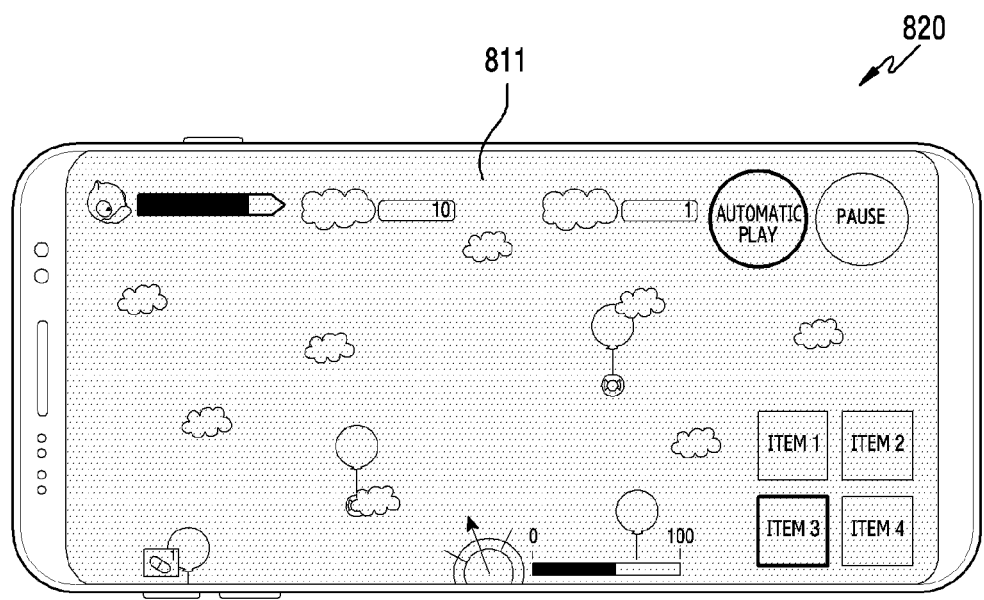

In an example, the processor 120 may control (change or set) the operation level of the game application which is being executed in the automatic play mode, to the second level. In response to the operation level of the game application being the second level, the processing speed of the game application may be 30 FPS, and the display brightness may be 100, and the volume may be 40. In response to the game application being executed in the automatic play mode, the processor 120 may, as illustrated in FIG. 8B, display the screen 811 related with the game application at a second brightness darker than first brightness, through the display device 160. The processor 120 may, while controlling the display brightness, overlay the screen 811 related with the game application with a black semitransparent screen (not shown).

According to various embodiments, in response to it being judged that the abnormal heating is not being recognized by the user (YES) in operation 713, the electronic device 101 may, in operation 717, control (change or set) the operation level of the function which is being executed. For example, the processor 120 may control (change or set) the operation level of the function which is being executed, correspondingly to the abnormal heating. The processor 120 may control (change or set) the operation level of the function which is being executed, from the first level to a third level lower than the second level.

Figure 8C:
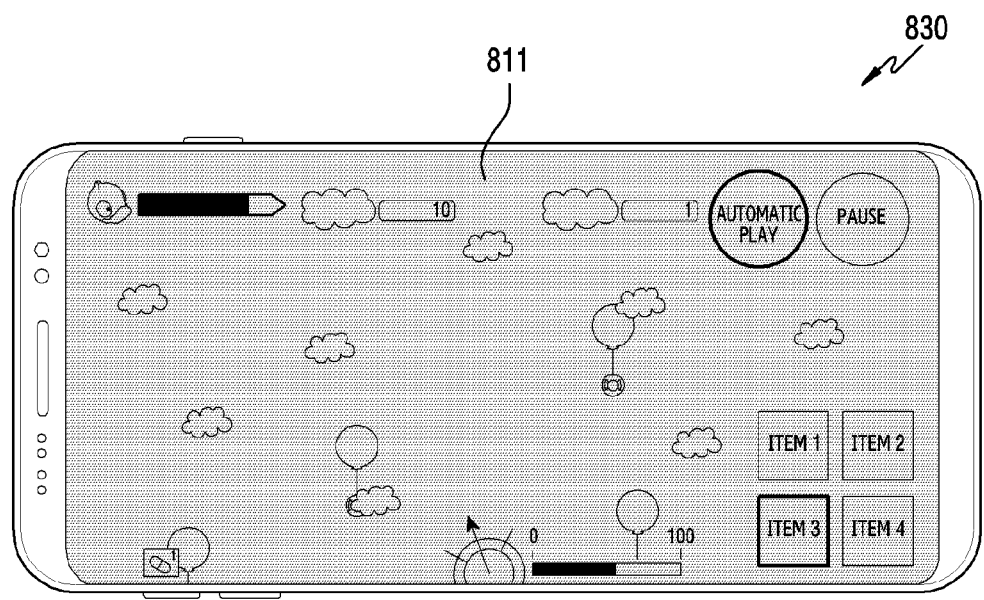

In an example, the processor 120 may control (change or set) the operation level of the game application which is being executed in the automatic play mode, to the third level. In response to the operation level of the game application being the third level, the processing speed of the game application may be 1 FPS, and the display brightness may be 10, and the volume may be 0. In response to the game application being executed in the automatic play mode, the processor 120 may, as illustrated in FIG. 8C, display the screen 811 related with the game application, at a third brightness darker than second brightness, through the display device 160. The processor 120 may, while controlling the display brightness, overlay the screen 811 related with the game application with the black semitransparent screen (not shown).

According to various embodiments, after controlling the function which is being executed in operation 717, the electronic device 101 may, in operation 719, judge whether the user recognizes the abnormal heating. For example, the processor 120 may judge whether the user recognizes the controlling of the function which is being executed. The processor 120 may judge whether the user recognizes, on the basis of an input of the user, which is identified through the input device 150. For example, the input device 150 may include at least any one of a touch panel or at least one physical key. The processor 120 may judge whether the user recognizes, on the basis of a touch input of the user identified through the touch panel or a key input of the user identified through the physical key.

According to various embodiments, in response to it being judged that the abnormal heating is not recognized by the user (NO) in operation 719, the electronic device 101 may return to FIG. 3. In response to the input of the user not being identified in operation 719, the processor 120 may maintain the operation level of the function which is being executed. For example, the processor 120 may maintain the operation level of the function which is being executed, as the third level.

According to various embodiments, in response to it being judged that the abnormal heating is being recognized by the user (YES) in operation 719, the electronic device 101 may, in operation 721, restore the operation level of the function which is being executed. In an example, the processor 120 may restore the operation level of the function which is being executed, to the second level. In another example, the processor 120 may restore the operation level of the function which is being executed, to the first level. After restoring the function which is being executed, the electronic device 101 may return to FIG. 3.

In an example, in response to the abnormal heating being recognized by the user in course of displaying the screen 811 related with the game application as illustrated in FIG. 8C, the processor 120 may restore the screen 811 related with the game application, to any one of the first brightness or the second brightness. As illustrated in FIG. 8A, the processor 120 may display the screen 811 related with the game application, at the first brightness. Or, as illustrated in FIG. 8B, the processor 120 may display the screen 811 related with the game application, at the second brightness.

Figure 8D:
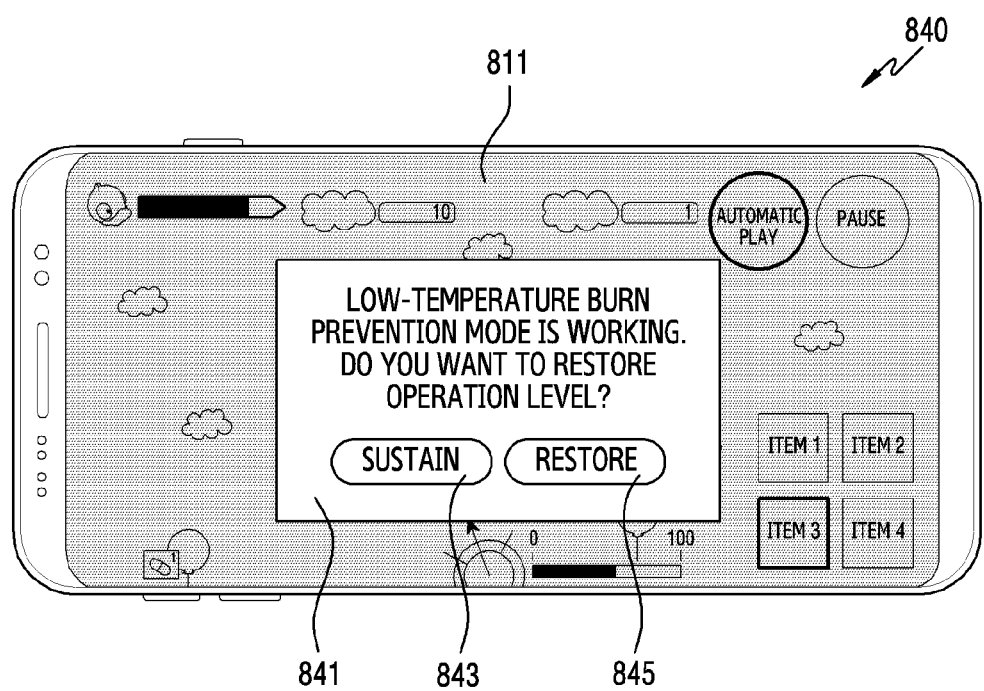

In another example, in response to the abnormal heating being recognized by the user in course of displaying the screen 811 related with the game application as illustrated in FIG. 8C, the processor 120 may judge whether to restore the operation level of the game application. For this, as illustrated in FIG. 8D, the processor 120 may display a window 841 for inquiring the user whether to restore the operation level, through the display device 160. While displaying the screen 811 related with the game application, the processor 120 may display the window 841. The window 841 may include a first button 843 for maintaining the operation level of the game application, and a second button 845 for restoring the operation level of the game application. After displaying the window 841 on the screen 811 related with the game application, the processor 120 may judge whether to restore the operation level of the game application, on the basis of an input of the user identified through the input device 150. The processor 120 may maintain the screen 811 related with the game application, at the third brightness, on the basis of an input of the user corresponding to the first button 843 of the window 841. The processor 120 may restore the screen 811 related with the game application, to any one of the first brightness or the second brightness, on the basis of an input of the user corresponding to the second button 845 of the window 841.

An operating method of the electronic device 101 of various embodiments may include determining whether heating of the electronic device 101 is abnormal heating, on the basis of a difference value between a first temperature at a first location in the electronic device 101 and a second temperature at a second location in the electronic device 101, and judging whether a user recognizes the abnormal heating, on the basis of the assumption that the heating of the electronic device 101 is determined to be the abnormal heating, and controlling the abnormal heating, on the basis of a result of judging whether the user has recognized.

According to various embodiments, determining whether it is the abnormal heating may include calculating the difference value, in response to the first temperature being equal to or being greater than a specified first threshold, and determining the heating of the electronic device 101 as the abnormal heating, in response to the difference value being less than a specified second threshold.

According to various embodiments, determining whether it is the abnormal heating may further include determining the heating of the electronic device 101 as the abnormal heating, in response to the difference value being less than the specified second threshold during a specified time.

According to various embodiments, judging whether the user recognizes the abnormal heating may include judging that the abnormal heating is not being recognized by the user, in response to a specified time having elapsed from a final reception time on an input of the user.

According to various embodiments, controlling the abnormal heating may include identifying whether the user is in contact to the electronic device 101, in response to it being judged that the abnormal heating is not being recognized by the user, and controlling the abnormal heating, in response to it being identified that the user is in contact.

According to various embodiments, controlling the abnormal heating may include changing an operation level of a function which is being executed, from a first level to a second level lower than the first level, on the basis of the assumption of judging that the abnormal heating is being recognized by the user, and changing the operation level of the function which is being executed, to a third level lower than the second level, on the basis of the assumption of judging that the abnormal heating is not being recognized by the user.

According to various embodiments, the operating method of the electronic device 101 may further include determining restoring or non-restoring of the changed operation level, on the basis of an input of the user identified through a user interface, and restoring the changed operation level to any one of the first level or the second level, on the basis of the input of the user.

According to various embodiments, controlling the abnormal heating may include controlling at least any one of a processing speed for a function which is being executed, a display brightness, or a volume.

According to various embodiments, the first location may include at least any one of a central processing unit, an application processor, an image signal processor, or a communication processor, and the second location may include at least any one of a battery, a charging circuit for the battery, a connection terminal, or a communication module.

According to various embodiments, a non-transitory computer-readable storage medium may store one or more programs for executing determining whether heating of the electronic device 101 is abnormal heating, on the basis of a difference value between a first temperature at a first location in the electronic device 101 and a second temperature at a second location in the electronic device 101, and judging whether a user recognizes the abnormal heating, on the basis of the assumption that the heating of the electronic device 101 is determined to be the abnormal heating, and controlling the abnormal heating, on the basis of a result of judging whether the user has recognized.

According to various embodiments, the electronic device 101 may effectively control heating of the electronic device 101. The electronic device 101 may sense that internal heating is not effectively discharged, and control a function which is being executed in the electronic device 101. That is, the electronic device 101 may control the function which is being executed in the electronic device 101, even without user's handling. Through this, the electronic device 101 may suppress heating caused by the function which is being executed. Accordingly, it may suppress the providing of a defect of electronic parts in the electronic device 101, and may prevent a low temperature burn of a user who is in contact with the electronic device 101.

An electronic device of various embodiments disclosed in the present document may be various types of devices. The electronic device may include, for example, a portable communication device (e.g., a smart phone), a computer device, a portable multimedia device, a portable medical device, a camera, a wearable device, or a home appliance. The electronic device of an embodiment of the present document is not limited to the aforementioned devices.

It should be appreciated that various embodiments of the present document and terms used therein are not intended to limit the technological features set forth in the present document to particular embodiments, and include various changes, equivalents, or replacements for a corresponding embodiment. With regard to the description of the drawings, similar reference symbols may be used to refer to similar or related components. A singular form of a noun corresponding to an item may include one item or more, unless the relevant context clearly indicates otherwise. In the present document, each of phrases such as "A or B", "at least one of A and B", "at least one of A or B", "A, B, or C", "at least one of A, B, and C", and "at least one of A, B, or C" may include any one of the items enumerated together in a corresponding one of the phrases or all available combinations thereof. Such terms as "a first", "a second", or "the first", "the second" may be used to simply distinguish a corresponding component from another corresponding component, and does not limit the corresponding components in another aspect (e.g., importance or sequence). If a component (e.g., a first component) is referred to, with or without the term "operatively" or "communicatively", as "coupled with", "coupled to", "connected with", or "connected to" another component (e.g., a second component), it means that the component may be connected with the other component directly (e.g., wiredly), wirelessly, or via a third component.

The term "module" used in the present document may include a unit implemented in hardware, software, or firmware, and may interchangeably be used with terms, for example, "logic", "logic block", "part", "circuitry" or the like. The module may be a single integral component, or a minimum unit of the component or part thereof, adapted to perform one or more functions. For example, according to an embodiment, the module may be implemented in the form of an application-specific integrated circuit (ASIC).

Various embodiments of the present document may be implemented as software (e.g., the program 140) that includes one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of various embodiments disclosed in the present document may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be at least temporarily stored, or be temporarily generated, in the machine-readable storage medium, such as a memory of a manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different sequence or omitted, or one or more other operations may be added.

The invention claimed is:

1. An electronic device comprising:
a first temperature sensor positioned at a first location;
a second temperature sensor positioned at a second location which is spaced apart from the first location;
a processor operably connected to the first temperature sensor and the second temperature sensor; and
a memory operably connected to the processor,
wherein the memory is configured to store instructions of, when being executed, allowing the processor to:
determine whether heating of the electronic device is abnormal heating, based on a difference value between a first temperature at the first location and a second temperature at the second location;
judge whether a user recognizes the abnormal heating, based on an assumption that the heating of the electronic device is determined to be the abnormal heating;
control the abnormal heating based on a result of judging whether the user has recognized,
change an operation level of a function which is being executed, from a first level to a second level lower than the first level, based on an assumption of judging that the abnormal heating is being recognized by the user; and
change the operation level of the function which is being executed, to a third level lower than the second level, based on an assumption of judging that the abnormal heating is not being recognized by the user.

2. The electronic device of claim 1, wherein the memory stores instructions of, when being executed, allowing the processor to:
determine the heating of the electronic device as the abnormal heating, in response to the first temperature being equal to or being greater than a specified first threshold and the difference value being less than a specified second threshold.

3. The electronic device of claim 2, wherein the memory stores instructions of, when being executed, allowing the processor to:
determine the heating of the electronic device as the abnormal heating, in response to the difference value being less than the second threshold during a specified time.

4. The electronic device of claim 1, further comprising an input device operably connected to the processor,
wherein the memory stores instructions of, when being executed, allowing the processor to:
judge that the abnormal heating is not being recognized by the user, in response to a specified time having elapsed from a final reception time on an input of the user identified through the input device.

5. The electronic device of claim 1, wherein the memory stores instructions of, when being executed, allowing the processor to:
control the abnormal heating, in response to a contact of the user to the electronic device being identified in a state of judging that the abnormal heating is not being recognized by the user.

6. The electronic device of claim 5, further comprising at least any one of an illuminance sensor or a proximity sensor, which is operably connected to the processor,
wherein the memory stores instructions of, when being executed, allowing the processor to:
identify the contact of the user by using at least any one of the illuminance sensor or the proximity sensor.

7. The electronic device of claim 1, further comprising at least any one of a battery operably connected to the processor, a charging circuit for the battery, a connection terminal, or a communication module,
wherein the second temperature sensor is positioned in at least any one of the battery, the charging circuit, the connection terminal, or the communication module.

8. The electronic device of claim 1, wherein the memory stores instructions of, when being executed, allowing the processor to:
determine restoring or non-restoring of the changed operation level, based on an input of the user identified through a user interface; and
restore the changed operation level to any one of the first level or the second level, based on the input of the user.

9. The electronic device of claim 1, wherein the memory stores instructions of, when being executed, allowing the processor to:
control at least any one of a processing speed for a function which is being executed, a display brightness, or a volume.

10. The electronic device of claim 1, wherein the processor comprises at least any one of a central processing unit, an application processor, an image signal processor, or a communication processor, and
wherein the first temperature sensor is positioned in at least any one of the central processing unit, the application processor, the image signal processor, or the communication processor.

11. An operating method of an electronic device, the method comprising:
determining whether heating of the electronic device is abnormal heating, based on a difference value between a first temperature at a first location in the electronic device and a second temperature at a second location in the electronic device;
judging whether a user recognizes the abnormal heating, based on an assumption that the heating of the electronic device is determined to be the abnormal heating; and
controlling the abnormal heating, based on a result of judging whether the user has recognized,
wherein controlling the abnormal heating comprises:
changing an operation level of a function which is being executed, from a first level to a second level lower than the first level, based on an assumption of judging that the abnormal heating is being recognized by the user; and
changing the operation level of the function which is being executed, to a third level lower than the second level, based on an assumption of judging that the abnormal heating is not being recognized by the user.

12. The method of claim 11, wherein at the first location in the electronic device, at least any one of a central processing unit, an application processor, an image signal processor, or a communication processor is disposed, and
wherein at the second location in the electronic device, at least any one of a battery, a charging circuit for the battery, a connection terminal, or a communication module is disposed.

13. The method of claim 11, wherein determining whether it is the abnormal heating comprises:
calculating the difference value, in response to the first temperature being equal to or being greater than a specified first threshold; and
determining the heating of the electronic device as the abnormal heating, in response to the difference value being less than a specified second threshold.

14. The method of claim 13, wherein determining whether it is the abnormal heating further comprises:
determining the heating of the electronic device as the abnormal heating, in response to the difference value being less than the second threshold during a specified time.

15. The method of claim 11, wherein judging whether the user recognizes the abnormal heating comprises:
judging that the abnormal heating is not being recognized by the user, in response to a specified time having elapsed from a final reception time on an input of the user.

16. The method of claim 11, wherein controlling the abnormal heating comprises:
identifying whether the user is in contact to the electronic device, in response to it being judged that the abnormal heating is not being recognized by the user; and
controlling the abnormal heating, in response to it being identified that the user is in contact.

17. The method of claim 11, wherein controlling the abnormal heating comprises:
controlling at least any one of a processing speed for a function which is being executed, a display brightness, or a volume.

18. The method of claim 11, further comprises:
determining restoring or non-restoring of the changed operation level, based on an input of the user identified through a user interface; and
restoring the changed operation level to any one of the first level or the second level, based on the input of the user.

* * * * *